United States Patent [19]

Gusella et al.

[11] Patent Number: 5,408,465
[45] Date of Patent: Apr. 18, 1995

[54] FLEXIBLE SCHEME FOR ADMISSION CONTROL OF MULTIMEDIA STREAMS ON INTEGRATED NETWORKS

[75] Inventors: Riccardo Gusella, Menlo Park; Ramanathan: Srinivas, La Jolla, both of Calif.

[73] Assignee: Hewlett-Packard Company, Palo Alto, Calif.

[21] Appl. No.: 80,606

[22] Filed: Jun. 21, 1993

[51] Int. Cl.⁶ .............................................. H04J 3/14
[52] U.S. Cl. ........................................ 370/17; 370/60; 370/60.1; 370/94.1
[58] Field of Search .................. 370/17, 60, 60.1, 94.1

[56] References Cited

U.S. PATENT DOCUMENTS

| | | | |
|---|---|---|---|
| 4,984,264 | 1/1991 | Katsube | 370/60 |
| 5,040,171 | 8/1991 | Osaki | 370/17 |
| 5,042,027 | 8/1991 | Takase et al. | 370/60 |
| 5,070,498 | 12/1991 | Kakuma et al. | 370/60 |
| 5,128,932 | 7/1992 | Li | 370/60 |

OTHER PUBLICATIONS

D. D. Clark, S. Shenker and L. Zhang, "Supporting Real-Time Applications in an Integrated Services Packet Network", Proceedings of ACM SIGCOMM, Aug. 1992.

I. Cidon, I. Gopal and R. Guerin, "Bandwidth Management and Congestion Control in plaNET", IEEE Communications Magazine, vol. 29, No. 10, Oct. 1991, pp. 54–64.

M. Decina, T. Toniatti, P. Vaccari and L. Verri, "Bandwidth Assignment and Virtual Call Blocking in ATM Networks", Proceedings of IEEE INFOCOM, May 1990, pp. 881–888.

D. Ferrari and D. C. Verma, "A Scheme for Real-Time Channel Establishment in Wide-Area Networks", IEEE Journal in Selected Areas in Communications, vol. 8, No. 3, Apr. 1990, pp. 368–379.

G. Gallassi, G. Rigolio and L. Fratta, "ATM: Bandwidth Assignment and Bandwidth Enforcement Policies", Proceedings of IEEE Globecom, 1989, pp. 1788–1793.

H. Gilbert, O. Aboul-Magd and V. Phung, "Developing a Cohesive Traffic Management Strategy for ATM Networks", IEEE Communications Magazine, vol. 29, No. 10, Oct. 1991, pp. 36–45.

R. Guerin, H. Ahmadi and M. Naghshineh, "Equivalent Capacity and Its Application to Bandwidth Allocation in High-Speed Networks, IEEE Journal on Selected Areas in Communication", vol. 9, No. 7, Sep. 1991, pp. 968–981.

R. Guerin and L. Gun, "A Unified Approach to Bandwidth Allocation and Access Control in Fast Packet-Switched Networks", Proceedings of IEEE INFOCOM, May 1992, pp. 1–12.

(List continued on next page.)

Primary Examiner—Douglas W. Olms
Assistant Examiner—Russell W. Blum

[57] ABSTRACT

An admission control scheme for real-time traffic requests in communication networks is disclosed. The scheme monitors tile performance of each link and predicts the traffic guarantees that can be offered when certain dummy traffic (pseudo traffic) mimicking the behavior of real-time streams is added to the existing traffic. When an application requests connection to the network, it specifies a Quality of Service (QoS) bound that it desires. A routing subsystem of tile network makes use of the predicted values while attempting to find a path over which tile application's QoS bound requirement will be satisfied. After the route is chosen, connection setup will involve verifying at each node along the route whether sufficient resources exist to support tile new connection. This explicit verification is likely to be necessary because the routing subsystem does not normally have up-to-date global state information. After admitting tile application, the network provides a soft guarantee that the QoS bound provided to it will be adhered to for most of the time. On the other hand, if no path through the network satisfies the QoS hound, tile application is denied connection to the network.

24 Claims, 7 Drawing Sheets

OTHER PUBLICATIONS

J. M. Hyman, A. A. Lazer and G. Pacificci, "Joint Scheduling and Admission Control for ATS-based Switching Nodes", ACM Computer Communication Review, vol. 22, No. 4, Oct. 1992, pp. 223–234.

S. Jamin, Scott Shenker, L. Zhang and D. D. Clark, "An Admission Control Algorithm for Predictive Real-Time Service" (extended abstract), Proceedings of the 3rd Intl. Workshop on Network and Operating System Support for Digital Audio and Video, Nov. 1992, pp. 308–315.

A. Hiramatsu, "Integration of ATM Call Admission Control and Link Capacity Control by Distributed Neural Networks", IEEE Journal on Selected Areas in Communications, vol. 9, No. 7, Sep. 1991.

Shuo-Yen R. Li, "Algorithms for Flow Control and Call Set-Up in Multi-Hop Broadband ISDN", Proceedings of IEEE INFO COM 1990, pp. 889–895.

G. Woodruff and R. Kositpaiboon, "Multimedia Traffic Management Principles for Guaranteed ATM Network Performance", IEEE Journal on Selected Areas in Communications, vol. 8, No. 3, Apr. 1990, pp. 437–446.

A. Lazar and G. Pacifici, "Control of Resources in Broadband Networks with Quality of Service Guarantees", IEEE Communications Magazine, Oct. 1991, pp. 66–73.

I. Habib and T. Saadawi, "Controlling Flow and Avoiding Congestion in Broadband Networks", IEEE Communications Magazine, Oct. 1991, pp. 46–53.

Ming Chen, "A Services Features Oriented Congestion Control Scheme for a Broadband Network", IEEE ICC 1991, pp. 105–109.

K. Murakami, "ATM Switching System Architecture and Implementation of B-ISDN", IEEE Region 10 Conference on Computer and Communication Systems, Sep. 1990, Hong Kong, pp. 658–662.

G. M. Woodruff, R. G. H. Rogers, and P. S. Richards, "A Congestion Control Framework for High-Speed Integrated Packetized Transport", IEEE, pp. 203–207.

FLEXIBLE SCHEME FOR ADMISSION CONTROL OF MULTIMEDIA STREAMS ON INTEGRATED NETWORKS

BACKGROUND OF THE INVENTION

1. Field of the Invention

The present invention relates to an admission control scheme for multimedia streams on an integrated network and, more particularly, to a method and apparatus for predicting whether or not to admit multimedia streams on an integrated network.

2. Description of the Related Art

Multimedia services require some combination of text, image, voice and video storage, and communication. Such multimedia services have potential applications in many areas, including medical imaging, education, banking, advertising and publishing.

Since integrated networks are capable of supporting a variety of multimedia services, they are presently being heavily researched for multimedia applications. Integrated networks support digital telephony, multimedia and data communications in an integrated fashion. An example of an integrated network is Broadband Integrated Services Digital Networks (BISDN).

Generally speaking, integrated networks are designed to allow both data and multimedia services to coexist. Data services, which are also termed best-efforts, are bursty and, for the most part, unpredictable. Therefore, in order to guarantee the performance requirements of real-time traffic, it is necessary to isolate real-time traffic from best-effort data.

Multimedia applications that integrate digital audio and video (among other media types) require certain traffic guarantees to achieve the performance which users of analog television systems are accustomed. These guarantees include that there will be sufficient bandwidth to accommodate the largest peaks transmitted; that there will be a small, constant end-to-end delay; and that there will be an upper bound (usually very small) on the probability of data loss. Other guarantees may be needed, for example, media synchronization, but these other guarantees can be provided by other components of a networked multimedia system.

Clearly, conventional data networks, with their emphasis on resource sharing and reactive congestion-control mechanisms, are woefully incapable of supporting real-time services. For example, the conventional protocol in data networks is to simply resend information when packets are lost or a data queue has overflowed due to congestion. Although this protocol might be acceptable for general data communications, it is totally unacceptable for real-time or interactive multimedia applications.

Furthermore, because of the timing requirements of multimedia applications, it is unacceptable to control admission of requests by admitting a new request tentatively, and then terminating the request if performance guarantees for the existing connections cannot be satisfied. For example, if the admission request were a movie, the movie would begin and then abruptly end, thereby frustrating the viewer.

In any event, conventional data networks fail on all counts because they cannot provide any of the three types of guarantees listed above. As a result, there has been a shift to rate-based, connection-oriented communication. Since real-time streams are rate limited, a network can try to set aside enough resources to handle the requests for guaranteed service before communication begins.

Before admitting a multimedia application to a network and allowing it to transmit, the network will require the application to declare its performance requirements and the traffic that it will produce. Using this specification, the network assesses whether it has sufficient resources to guarantee that tile application's requirements can be satisfied, and a connection established, hopefully without violating the requirements of any of the existing connections. Only then is the application allowed to transmit.

The nature of the performance guarantees that networks must provide can be classified into two broad categories: hard real-time guarantees when the requirements of an admitted application will never be violated, and soft real-time guarantees when the network will occasionally, but infrequently, violate the application's requirements. When providing hard real-time service, the network guarantees apply irrespective of the behavior of all other applications that will be simultaneously using the network. Consequently, when hard real-time guarantees are required, admission control must be based on the worst-case behavior of each individual connection. Furthermore, either the network switching equipment must isolate the various connections from one another so that they have exclusive use of the resources that have been assigned to them, or resource reservation at admission-control time must be done explicitly on a per connection basis. Worst-case resource allocation and isolation of resources often results in poor network utilization.

With soft-real time service, network resources are shared among a group of connections. The network cannot guarantee that the performance requirements of a group of connections will be continuously satisfied. Nevertheless, since soft real-time services avoid the worst-case design necessary for hard real-time services, soft real-time services will result in a much higher utilization of network resources than hard real-time services. However, the key to the successful deployment of soft real-time services on integrated networks will depend on the effectiveness of the admission-control scheme, which must be conservative enough to ensure that violations of applications' performance requirements are infrequent, while at the same time ensuring that the network is sufficiently utilized to make it economically competitive. Because resources are allocated to groups of connections, rather than to individual connections, soft real-time services offer the additional advantage of simplified network management. Specifically, resource managers need only allocate and administer pools of resources tier each of the groups that share them, rather than for a multitude of individual connections. Furthermore, a soft-real time service may be the only viable service for multimedia traffic that can be supported on the first generation of asynchronous transfer mode (ATM) networks switches, which have a limited number of queues, typically two to four, per link.

In order to obtain performance guarantees, an application must translate its traffic requirements, possibly using an application programming interface, into network requirements, which are provided to the network through a service interface. The service interface also allows an application to specify the type and quality of guarantees that the application needs. There are typically three elements in a service interface: a traffic contract used by the application to describe the characteristics of the traffic it will produce; a set of objective values for Quality of Service (QoS) parameters that the network defines; and the type of commitment that is requested.

The traffic contract, which models the application's traffic, is used as a basis for making admission decisions. A commonly used model is in the form of a token-bucket descriptor, a two-parameter descriptor (r,b), in which r is the rate at which tokens accumulate in the token bucket and b is the capacity of the bucket. Tokens, which represent credits for units of transmission, overflow when the bucket is full, i.e., when it already contains b tokens. Thus, r is the average rate of the model and b is the maximum size of a burst that can be transmitted at once. The translation between the characteristics of a data stream produced by an application and the token-bucket model need not be performed by the application itself, but is likely to be offered as a system function by applications' libraries.

Performance guarantees are requested by providing objective values for the QoS parameters defined by the service interface. These parameters may include end-to-end delay and loss probability. Additional guarantees, such as delay-jitter bounds or synchronization guarantees, may be provided by higher layers of the network.

The third element of the service interface is used to indicate the service commitments, which may be implicit if a network provides only one class of commitments. Whereas the QoS parameters determine the type of service offered by the network to the application, the service commitment determines tile quality of tile requested service. As previously mentioned, service commitments provided by the network to multimedia real-time applications can be categorized into hard real-time guarantees and soft real-time guarantees.

Before a decision can be made about an application's request for admission, a network's routing subsystem must find a path from source to destination. Without cooperation from the routing subsystem (e.g., routers), a network's ability to support real-time traffic is greatly impaired. In order to choose among potential paths for routing application requests, the routing subsystem usually requires information about the status of all network links and associated switching nodes. This information must be provided by network managers implemented at each of the network nodes. Admission control is, however, still necessary since in some cases the routing subsystem's choice may not be up-to-date.

Admission control need not rely on routing for making admission decisions. However, since the choice of the path along which the application request will attempt to establish a connection is determined by a routing algorithm, the effectiveness of admission control (measured in terms of the numbers of admitted requests, the number of incorrect admissions, etc.) will be dependent on the intelligence built into the routers. A naive routing algorithm may thwart the effectiveness of any admission-control scheme. For example, it is easy to construct an example in which a routing algorithm that only routes requests over the shortest path will saturate that path resulting in unbalanced link utilization and high real-time call blocking probability.

Several known admission-control schemes do not require that routes be chosen according to the requested guarantees. Clark et al., *Supporting Real-Time Applications in an Integrated Services Packet Network*, Proceedings of ACM SIGCOMM, August 1992, pp. 14-26, describes a predictive service that does not depend on routing and that may still be acceptable because it is designed for adaptive applications whose initial QoS bounds are relaxed. Ferrari et al., *A Scheme for Real-Time Channel Establishment in Wide-Area Networks*, IEEE Journal in Selected Areas in Communications, Vol. 8, No. 3, April 1990, pp. 368-379, at least in the initial description of the Tenet scheme, also do not support routing. They have recently indicated, however, that they may be able to support routing. Their scheme, however, which requires detailed switching-node and link information, seems to preclude an easy implementation of this feature. Known techniques that support policy-based routing are presently not directly related to network admission control, see Estrin et al., *A Protocol for Route Establishment and Packet Forwarding Across Multimedia Across Multidomain Internets*, IEEE-/ACM Transaction on Networking, Vol. 1, No. 1, February 1993, pp. 56-70.

To support real-time information, tile network must implement an admission control function. The admission control function is in charge of allocating network resources (bandwidth, buffer space, transmission scheduler time, etc.) in such a manner that the service commitments provided to all admitted connections are adhered to throughout the lifetime of the connections. Since a network has limited resources, the network must restrict the number of applications to which tile network can simultaneously provide service commitments. Admission control refers to the process of making decisions on whether or not a new application request can be admitted to the network based on the current status of the network and on the service requirements of the new request. A new application request is admitted if it satisfies the following two admission rules:

(1) The network is capable of providing the new connection with the service that the application requires.
(2) The service commitments provided to existing connections will continue to be satisfied after tile new request is admitted.

Since admission control attempts to prevent the occurrence of congestion, admission-control is a proactive form of congestion control.

Known admission-control schemes have adopted contrasting methods for controlling admission of application requests to networks. A number of schemes have simulated target environments under different operating conditions and have utilized the data obtained from these simulations to make admission decisions in actual network environments. See Decina et al., *Bandwidth Assignment and Virtual Call Blocking in ATM Networks*, Proceedings of IEEE INFOCOM, May 1990, pp. 881-888; Gallassi et al., *ATM: Bandwidth Assignment and Bandwidth Enforcement Policies*, Proceedings of IEEE Globecom, 1989, pp. 1788-1793; Woodruff et al., *Multimedia Traffic Management Principals for Guaranteed ATM Network Performance*, IEEE Journal on Selected Areas in Communications, Vol. 8, No. 3, April 1990, pp. 437-446. The static nature of data obtained from simulations makes these schemes impractical for deployment in large-scale networks in which traffic and network characteristics may change dynamically. Alternatively, other schemes have relied on pre-specified information about the behavior of traffic sources provided as part of the traffic contract to derive analytical expressions that are used for making admission decisions, see Ferrari et al,, supra; Cidon et ai., *Bandwidth*

*Management and Congestion Control in plaNET*, IEEE Communications Magazine, Vol. 29, No. 10, October 1991, pp. 54–64. There are several disadvantages with these schemes. First, the traffic descriptors are too elaborate requiring several different parameters (in contrast a leaky-bucket descriptor has only two parameters). Second, these schemes are independent of routing. Third, these schemes work efficiently only with a few switch scheduling disciplines. Finally, these schemes rely on worst-case assumptions and result in poor network utilization for the real-time class.

Technological advances are making it possible for integrated networks to support not only today's non-real-time applications, but also new multimedia applications that demand performance guarantees. Because performance guarantees such as bandwidth and delay-bounds cannot be provided by conventional reactive mechanisms for congestion control, improved traffic admission control techniques (proactive congestion-control mechanisms) are needed for real-time networks.

Thus there is a need for a novel, flexible admission control scheme to control admission of multimedia streams on an integrated network.

SUMMARY OF THE INVENTION

Broadly speaking, the invention relates to a scheme for controlling admission of real-time traffic to a network. The scheme relies on measurement of the actual behavior of traffic sources as well as the performance provided to all existing connections in order to make future admission decisions. More particularly, the admission control scheme, according to the invention, predicts performance parameters that will exist when one or more additional connections are added to the network links. Thereafter, the predicted performance parameters enable the admission control scheme to determine if the network has the resources needed to satisfy the QoS commitments requested by future applications.

The admission control scheme of the invention is directed to admission of soft real-time applications in a network (e.g., integrated network). The admission control scheme uses pseudo streams (traffic) to predict the behavior of the network should a new connection be admitted to the network. The pseudo streams are established through queues associated with the network links and have traffic characteristics that are similar to those of the application requests. After setting up pseudo streams, network performance is measured to predict the behavior of the network if a new application request were to be admitted. If the pseudo stream makes the network approach a state of congestion, the pseudo stream is suspended, thereby either avoiding congestion completely or restoring the network which has become congested to an uncongested state. Network links that cannot handle the pseudo stream (i.e., links which become congested) are not able to admit additional admission requests.

One implementation or the invention concerns a method for monitoring performance of a link in a network having a plurality of nodes interconnected by links. The method initially adds pseudo traffic to existing traffic through a queue associated with a link (but on the link itself), and then predicts at least one performance guarantee that the link can offer to a connection request. The performance guarantees are, for example, delay, loss ratio, or both.

Another implementation of the invention concerns a network node for an integrated network. The node includes at least a connection circuit for passing traffic by operatively connecting an incoming link to an outgoing link, a pseudo traffic controller for supplying pseudo traffic, a queue for queuing the pseudo traffic and real-time traffic, and a performance parameter prediction unit for predicting a performance parameter of the queue. The connection circuit operates to transmit the real-time traffic output form the queue and to discard the pseudo traffic output from the queue.

Additional implementations of the invention are described or obvious from the detailed description and claims.

The invention offers a number of benefits, including the following. The admission control scheme supports all types of multimedia applications, including adaptive applications. The admission control scheme is applicable to homogeneous and heterogeneous networks. The admission control scheme is not dependent on the support (or differing support) offered at switching nodes (e.g., switch design) or scheduling disciplines that they employ. The admission control scheme is also implementable over a variety of hardware and networking technologies. In addition, the admission control scheme can adapt to dynamic changes in network topology, load conditions, traffic characteristics, and QoS requirements of applications. Furthermore, by sharing network resources among groups of connections, the admission control scheme results in higher network utilization than is the case if network resources were to be dedicated to individual connections.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of tile invention are discussed below with reference to FIGS. 1–9. However, those skilled in the art will readily appreciate that the detailed description given herein with respect to these figures is for explanatory purposes as the invention extends beyond these limited embodiments. The invention relates to a scheme for admission control of real-time multimedia traffic requests in communication networks. The admission-control scheme relies on performance-parameter prediction and supports soft real-time commitments.

Before starting communication, an application must request admission to all network nodes located on a path from the source to the destination. It is the task of the network's routing subsystem to choose a path that is likely to have sufficient resources to admit the new request at every intermediate node and that is likely to satisfy the application's QoS constraints. In contrast, the task of the admission-control scheme is to verify that the new request can be admitted over that path.

Figure 1:
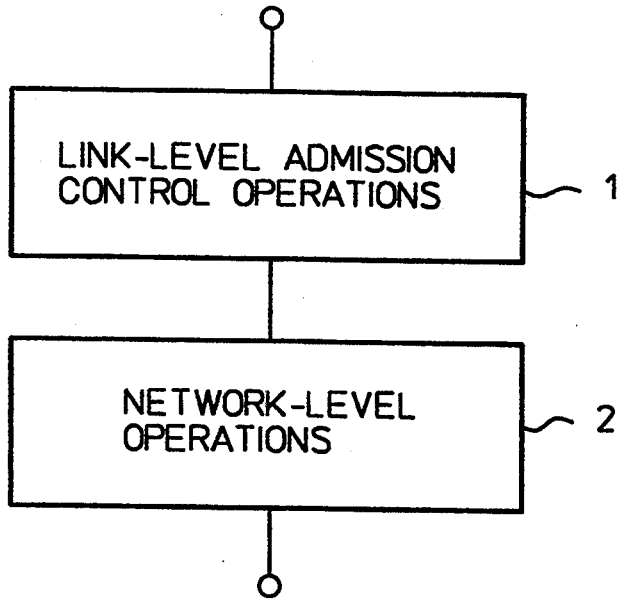
FIG. 1 is a block diagram illustrating the procedures of the admission control scheme of the invention.

FIG. 1 is a block diagram of the admission control scheme of the present invention. The admission-control scheme consists of link-level admission control operations 1 and network-level admission control operations 2. The preferable operation of the admission control scheme is to operate the link-level admission control operations 1 periodically to determine the availability of network resources, and to operate the network-level admission control operations 2 upton receipt of each request for admission to the network. The link-level admission control 1 operations test the validity of admission rule (1) on a link-by-link basis (i.e., whether existing communication streams will continue to receive satisfactory service even if a new request is added), whereas the network-level admission control 2 verifies the condition of admission rule (2) on an end-to-end basis (i.e., whether the application's QoS requirements will be satisfied if a new request is added). The admission rules (1) and (2) were discussed above.

Figure 2:
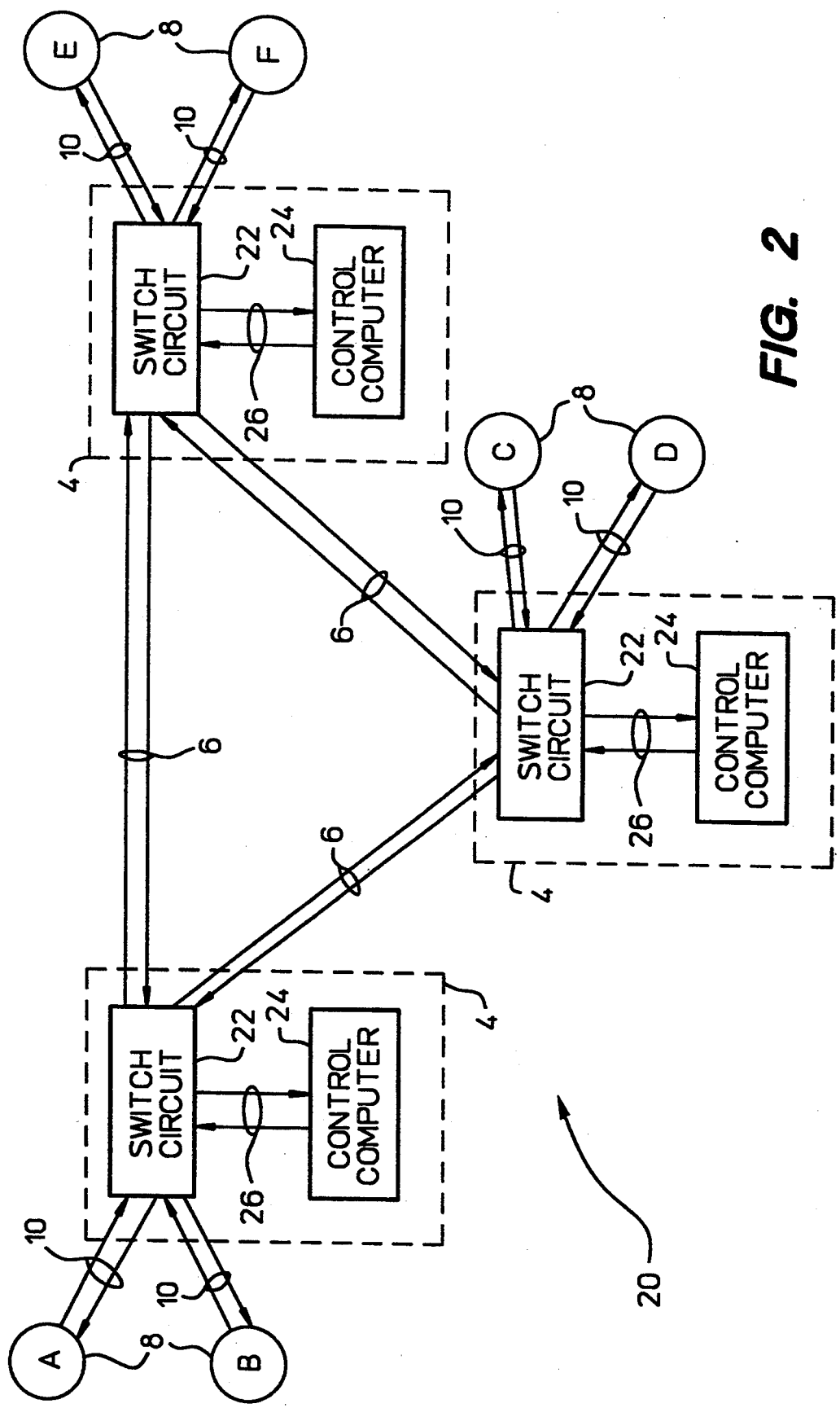
FIG. 2 is a diagram of an integrated network.

The admission control scheme is utilized by a network to perform admission control. FIG. 2 is a diagram illustrating all example of an integrated network 20. The network 20 includes a plurality of nodes 4. The nodes 4 are electrically or optically coupled to neighboring nodes 4 via network links 6. Hosts 8 are electrically or optically coupled to the nodes 4 via network links 10. The nodes 4, among other things, control the flow of traffic through the network 20. Namely, if a host 8 (source) desires to transmit traffic to another host 8 (destination), the nodes 4 must configure their switching tables such that the information from the source to the destination can be communicated over the appropriate links 6, 10. The hosts 8 can be a variety of devices, such as computers, telephones, videophones and the like. In FIG. 2, each of the nodes 4 is illustrated as a switching node 4 including a switch circuit 22, a control computer 24 and links 26. The control computer 24 is electrically or optically coupled to the switch circuit 22 via the links 26 and controls the transmission of information through the corresponding node 4.

Each switching node 4 is capable of receiving an application request from the hosts 8 connected to the switching node 4. An application request requests a connection through the network 20 so as to provide a path from the source host 8 to the destination host 8. The switch circuit 22 operates to multiplex data over the links 6, 10 in accordance with the path so that the application request received at the switching node 4 can be transported to the destination host 8.

Some networks implement the switching and control functions with separate units. In such networks, the switching function may be provided by a fast hardware switch circuit that has relatively little additional processing capabilities, and the control functions may be performed by a control computer that is much slower than the switch circuit but has sophisticated processing capabilities. Other networks may implement both the switching and control functions in tile same unit, as is presently tile case with Internet routers and gateways. For the sake of generality, the switching nodes 4 are shown in FIG. 2 are hereafter described as having separate switching anti control units. Further, the admission control scheme of the present invention is implementable in a variety of networking technologies, including asynchronous transfer mode (ATM) and fiber distributed data interface (FDDI).

Applications request performance guarantees by specifying objective values for the QoS parameters defined by the service interface. The QoS parameters supported by the service interface are end-to-end delay and the end-to-end ratio of lost packets to transmitted packets (loss ratio). Those skilled in the art will recognize that the loss ratio could alternatively be measured as the ratio of lost packets to successfully received packets. Other QoS requirements, such as bounds on delay-jitter, may be addressed at the application level rather than at tile network level. Bandwidth is not a QoS parameter but rather a source traffic descriptor parameter, which can be expressed by a leaky bucket descriptor.

The admission-control scheme maps a QoS request to the most appropriate service class, or level of service, on each node. 5Each node 4 supports one or more service classes per output link 6, 10. In order to rio so, a node 4 allocates separate node resources to each service class.

Because services classes rely on adequate resource allocation, service classes require appropriate hardware and software support in each network node 4. For instance, if the output-link queues are implemented ill hardware, there must be at least one queue for each service class. In addition, the properties of service classes rely heavily on the link queuing discipline. In order to be compatible with various network hardware and with most scheduling disciplines, the basic admission-control scheme is designed to be very general. When requesting performance guarantees, a source must define the traffic it will produce with a traffic contract. This may be done (as discussed above) using a token-bucket descriptor, with parameters r and b, where r is the rate at which tokens accumulate in the token bucket and b is the capacity of the bucket. The token-bucket descriptor provides an envelope for the traffic produced by a source: in no circumstances should the traffic produced exceed the rate or the burst implied by the token-bucket model. Although traffic generated by a media source is typically described using a token-bucket descriptor, other traffic descriptors such as jumping or sliding window descriptors could also be used.

The link-level admission control operations I (FIG. 1) evaluate whether or not a request should be admitted over a link 6, 10 by predicting the value of certain key performance parameters alter adding an additional load to a service class in excess of its actual load. The key parameters are queuing delay and loss ratio. The additional load (referred to as pseudo traffic) is produced locally in a network node 4 and is used to occupy queue space, but is not transmitted over the link 6, 10.

Pseudo traffic is added before a call admission request is received. As pseudo traffic is produced, a node 4 measures the queuing delay and/or the loss ratio.

Should the measured values exceed the values acceptable by the service class, the pseudo traffic is immediately suspended and the routing subsystem is informed that no additional traffic can be admitted to that service class. If the performance values do not violate the requirements of the service class, the value of the token-bucket descriptor used to produce the pseudo traffic, as well as the measurements of delay and loss are transmitted to the routing subsystem.

Network-level admission control 2 (FIG. 1) is necessary to apportion the end-to-end QoS requirements of a call request among the various network nodes. This is done in two steps. First, in a forward pass from source to destination, node resources are tentatively reserved. Second, in the backward pass, the resources are released if the QoS requirements cannot be satisfied. If the QoS requirements can be satisfied, the resources are committed, the stream is assigned to the various service classes at each node 4, and the end-to-end QoS requirements apportioned among the various nodes 4. Note that the bandwidth requirements are the same for all links 6, 10 along the path.

Admission Control Over a Network Link

Link-level admission control 1 over a network link 6, 10 is based on the following question: given that a number of connections are simultaneously using a network link and that the network link is not congested (i.e., the QoS requirements of all existing conditions are satisfied) can an additional connection can be admitted over that link without violating the QoS commitments offered to all connections utilizing that network link?

Violations of QoS commitments provided by a switching node 4 to existing connections may occur because of over allocation of network resources. The dynamics of queuing systems indicate that performance degrades as allocated resources approach the total allocable capacity. In some cases, even when the network utilization is not very high, the addition of a new request may result in instantaneous over commitment of network resources, thereby increasing the maximum queuing delays over that link. Such an increase will result in violation of delay guarantees provided to applications at the time of admission.

The admission-control scheme functions prevent these undesirable situations from occurring by predicting what the performance guarantees would be if a new request were to be admitted over the network link. Hence, the prediction of performance parameters, such as queue delay and loss ratio, is a necessary step.

To be effective an admission control scheme must be able to predict performance parameters if the new request were to be admitted. This can be achieved using measurements of queuing delays and/or losses. To simplify the description, the admission-control scheme is initially described for the case in which tile traffic sources are homogeneous and in which each switching node offers only a single service class (i.e. a single QoS bound).

The mechanism used for performance parameter prediction is a pseudo stream. Pseudo streams are streams transporting dummy data that are established in each of the queues for the sole purpose of predicting performance parameters that would ensue from certain additional loads on the network 20. Since tile real-time traffic is assumed to be homogeneous and tile traffic characteristics are known, dummy data can be transported by the pseudo streams at a rate that mimics traffic over a real-time multimedia stream.

A pseudo stream imposes the same load on tile network 20 as an additional real-time connection would if it were admitted over tile network link 6, 10 under consideration. Packet delays or losses, as measured when the pseudo stream is active, are indicative of the delays or losses that would be offered to all real-time connections if a new application request were to be admitted.

Figure 3:
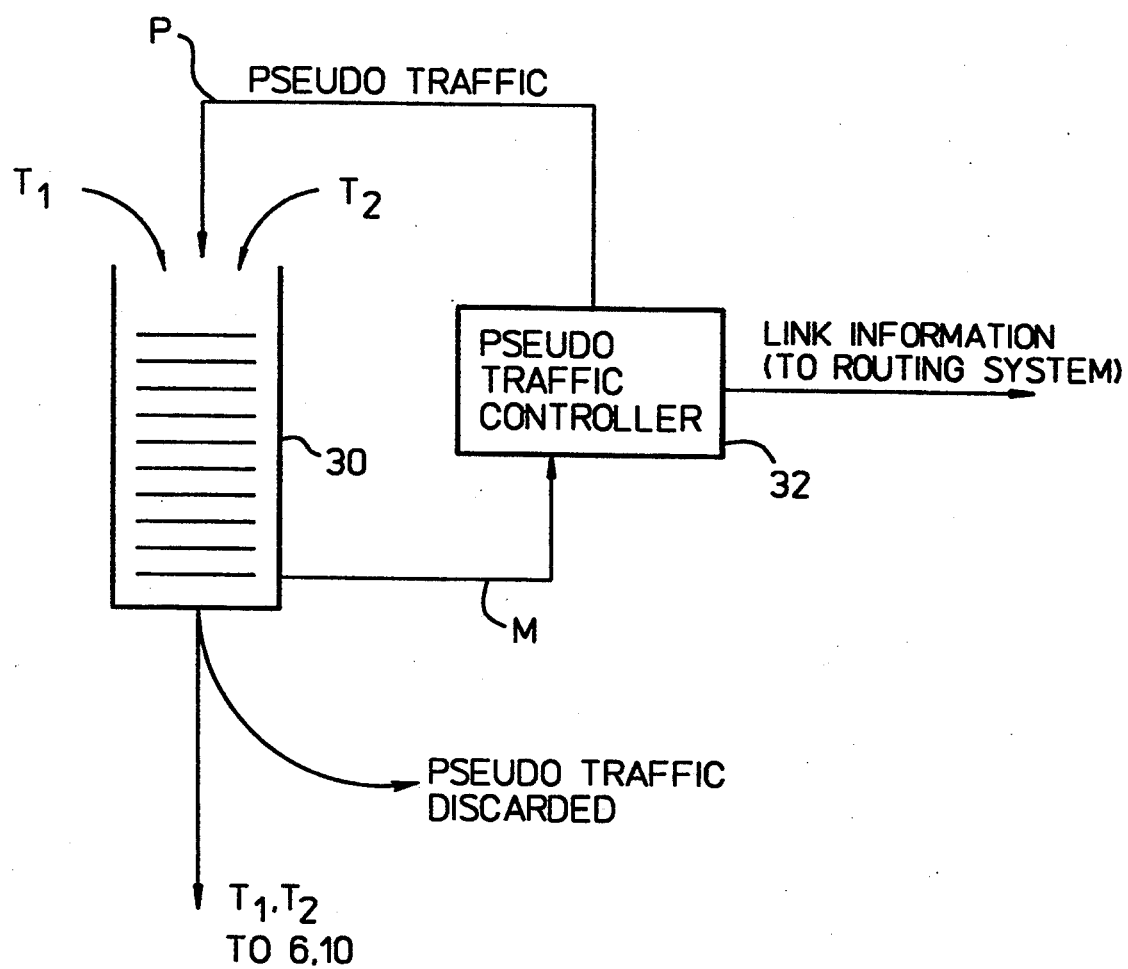
FIG. 3 is a first schematic diagram illustrating a performance parameter prediction technique associated with link-level admission control operations of the present invention.

FIG. 3 is a schematic diagram of tile performance parameter prediction of the link-level admission control operations 1 of tile invention. Each outgoing link 6, 10 of each node 4 has one or more real-time queues 30 associated with it. A real-time queue 30 receives real-time streams T1, T2 from incoming links 6, 10. For each outgoing link 6, 10 of each node 4, the queuing delay and/or loss ratio of the traffic through the queue 30 is predicted using pseudo streams P. Pseudo traffic (i.e., packets transported over the pseudo stream) is queued in the real-time queue 30, and experiences the same queuing delay or loss ratio at the switch 22 as other real-time streams in the queue 30. A pseudo traffic controller 32 (which may be implemented in software within the control computer 24 or in some specific hardware) controls the production of pseudo streams and their injection into the queues 30 as well as the performance parameter measurements M (e.g., queuing delay and/or loss ratio). Note that the queues 30 can be implemented in either hardware or software.

Figure 4:
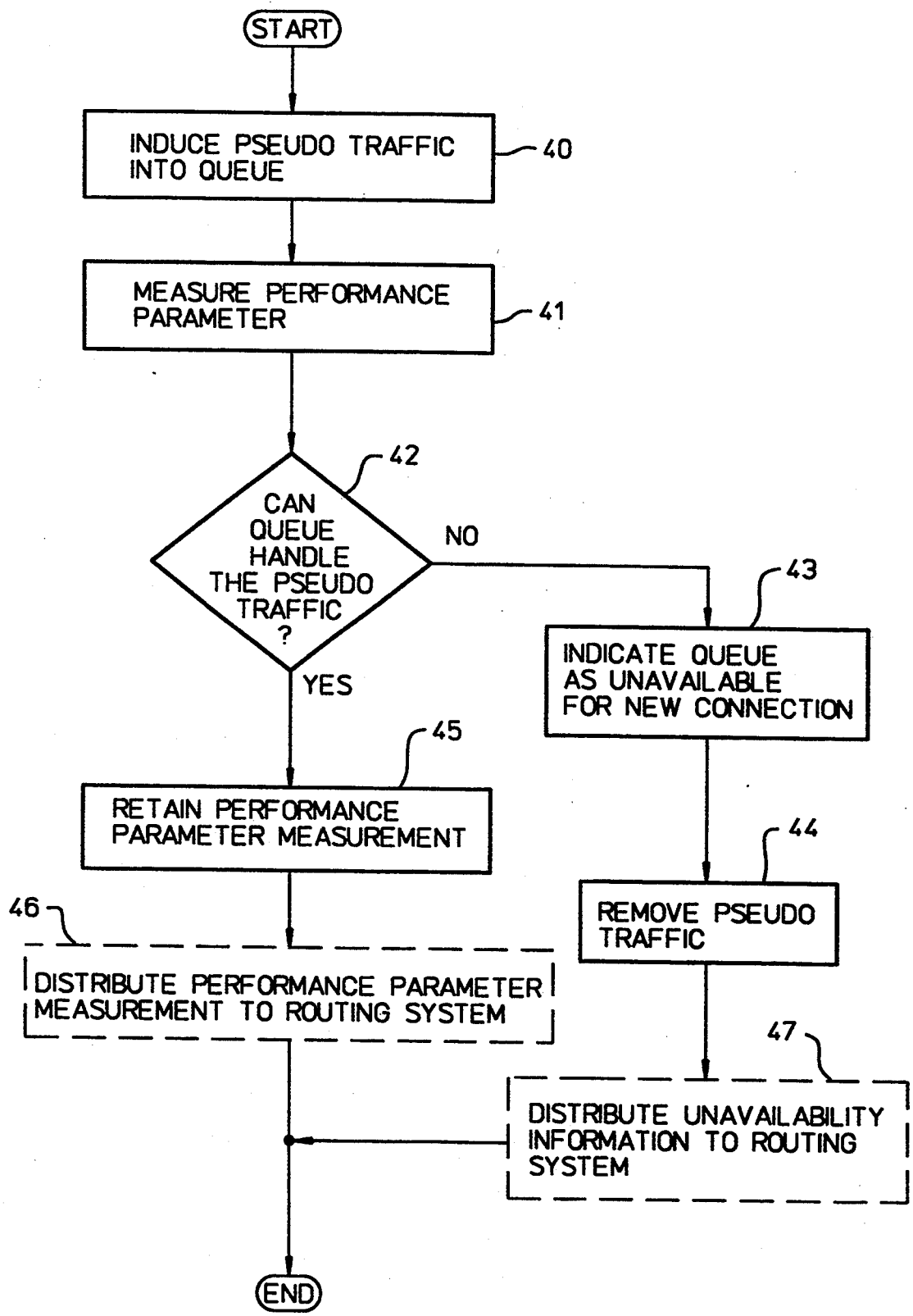
FIG. 4 is a flow chart of an embodiment of the link-level admission control operations of the invention.

FIG. 4 is a flow chart of the method steps for an embodiment of the performance parameter prediction of the link-level admission control operations 1. Pseudo traffic P (i.e., packets transported over the pseudo stream) is induced 40 into the real-time queue 30. A performance parameter of the real-time queue 30 is then measured 41. The performance parameter P, as measured when the a pseudo traffic is active, is a prediction of the QoS (e.g., delay, loss ratio, or both) that would be offered to all real-time connections of the associated switching node if a new application request were to be admitted.

Next, a decision 42 is made based on the first admission rule. The decision 42 hinges on whether the queue 30 can handle the pseudo traffic P, that is, whether (after the pseudo traffic is induced) the QoS commitments for existing connections are still satisfied. If not, the queue 30 is indicated 43 as being unavailable for a new connection, and the pseudo traffic is removed 44. On the other hand, if the queue 30 is capable of handling the pseudo traffic (i.e., QoS commitments for existing connections are still satisfied), then the performance parameter measurement is retained 45 for later use in the network-level admission control operations 2.

Further, when the queue 30 can handle the pseudo traffic, the performance parameter measurement 41 is forwarded 46 to the routing subsystem. Likewise, when the queue 30 is indicated 43 as being unavailable, information denoting such unavailability is forwarded 47 to the routing subsystem for the network 20. The operations illustrated in blocks 46 and 47 of FIG. 4 are optional. Although the link-level admission control operations 1 need not interact with the routing subsystem, it is preferred to forward the performance parameter measurement (e.g., queue delay, loss ratio, or both) or unavailability information to the routing subsystem so that the routing subsystem can choose a potential path which is more likely to admit the request. Typically, the routing subsystem would store the performance parameter measurement or the unavailability information for each queue 30 in a routing table (not shown).

The pseudo stream used for performance parameter predictions serve a dual purpose: not only does a pseudo stream enable timing delays to be predicted, but it also enables the bandwidth sufficiency condition to be implicitly tested. If a pseudo stream can be supported over a network link 6, 10, sufficient bandwidth should exist for admitting another real-time stream over that network link 6, 10.

If at any stage the admission of a new request over a network link 6, 10 causes the QoS bounds of any of the existing connections to be violated, transmission of the pseudo stream that exists on that link is suspended. Suspension of pseudo traffic upon detection of QoS bound violations should restore network performance to satisfactory levels (providing all sources behave in the same manner as before) because: (i) QoS requirements were not violated prior to the admission of the new request, (ii) the required quality of service can be provided by the network if the last request that was admitted is terminated, and (iii) since a pseudo stream affects all other connections in exactly the same manner as the new request, suspension of traffic on the pseudo stream is akin to termination of the new connection, and therefore the network will be brought back to a state in which QoS requirements of all existing connections are satisfied.

Figure 5:
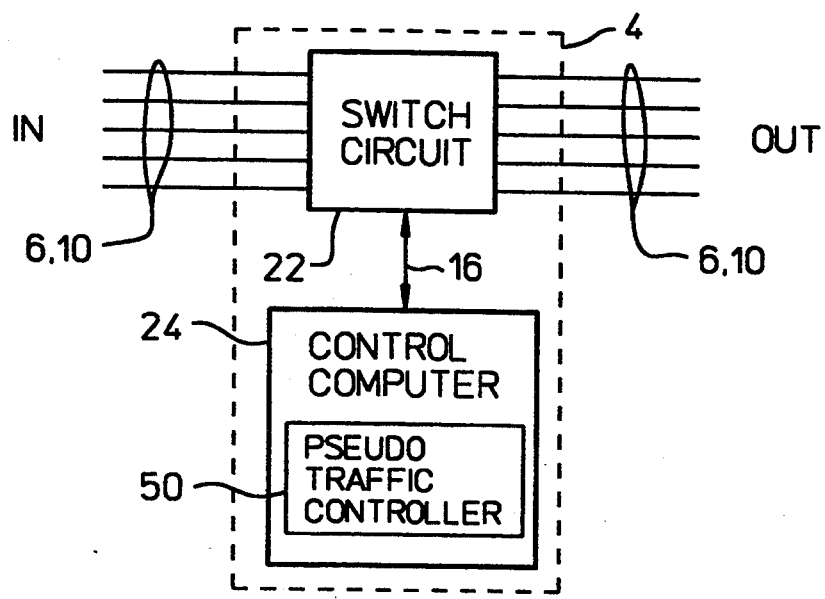
FIG. 5 is a block diagram illustrating a first embodiment of a switching node.
Figure 6:
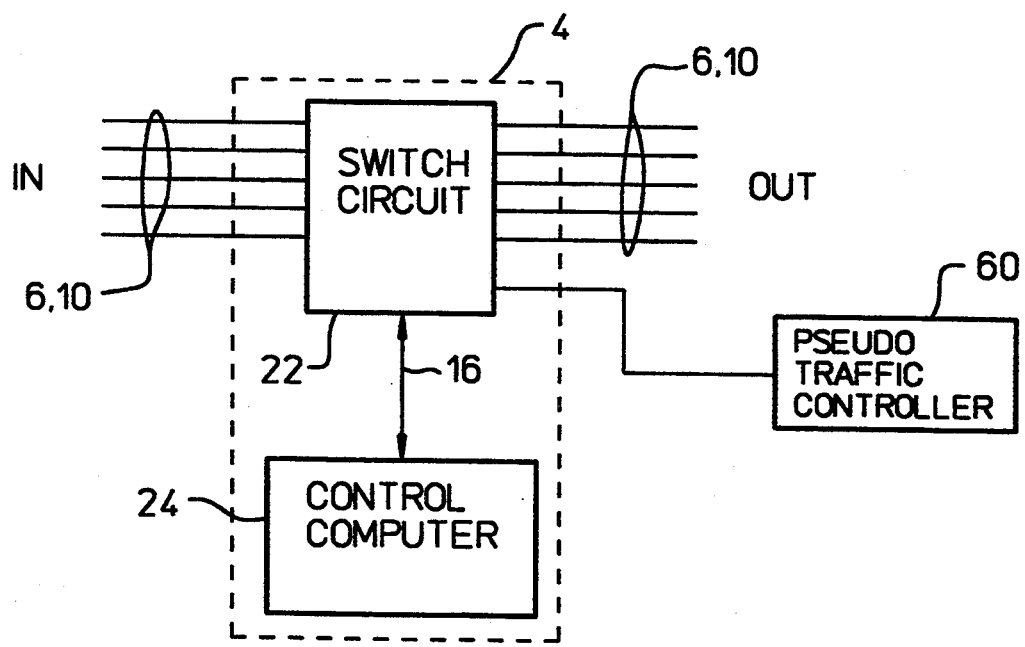
FIG. 6 is a block diagram illustrating a second embodiment of a switching node.

Pseudo traffic controllers 32 may be implemented in a number of different ways. Three implementations for the pseudo traffic controller 32 are discussed herein. The first implementation is in soilware at the control computers 24. In this regard, FIG. 5 is a block diagram of a node 4 in which a pseudo traffic controller 50 forms part of the control computer 24. In this first implementation, software in the control computer 24 generates the pseudo traffic P as needed. The second implementation uses specialized hardware components connected to one of the input ports of the switches 22. In this regard, FIG. 6 is a block diagram of a node 4 in which a pseudo traffic controller 60 generates the pseudo traffic P. The third implementation would be to incorporate the pseudo traffic controller within the switch circuit 22. In all cases, a queue server must be capable of distinguishing pseudo packets from packets belonging to the actual real-time traffic. This distinction can be made by using a special identifier to identify pseudo packets. Pseudo packets injected in a switching node 4 are queued in the real-time queue 30 associated with an output link on that switching node 4. The pseudo packets are then discarded at the originating node (i.e., the switch discards pseudo packets just prior to their transmission over the network links and the packet slot in which the pseudo packets would have been transmitted are left unutilized).

Since the admission-control scheme employs a measurement-based mechanism as opposed to an analytical formulation for performance parameter (QoS) prediction, the QoS prediction technique of the invention described above does not rely on any particular scheduling discipline or queuing strategy at the switching nodes 4. However, the manner in which performance parameter measurement is pertbrined is dependent on the switch design. If a switch 22 is capable of timestamping packets (using timers) at the time of their arrival and at the time of their transmission from the switch 22, delay measurements are easily obtained. The delay of a packet at a switching node 4 is the difference between the timestamp upon its transmission from that node and the timestamp it receives upon its arrival at that node. Measurements of delays are the worst-case values of individual packet delays or some high percentile of the packet-delay distribution.

In cases in which it is not possible to timestamp packets at a switching node 4, probe packets may be transmitted by the resource managers, solely for the purpose of delay measurement. The round-trip delay of probe packets can be used to estimate the queuing delays at the switching nodes. A number of techniques for such an estimation are known in the art. See, e.g., Guseella et al., *The Accuracy of the Clock Synchronization Achieved by TEMPO in Berkchley UNIX 4.3BSD*, IEEE Transactions on Software Engineering, July 1989; D. L. Mills, *Internet Time Synchronization: The Network Protocol*, IEEE Transactions on Communications, 39(10), 1991, pp. 1402-1493.

Network-Level Admission Control

Figure 7:
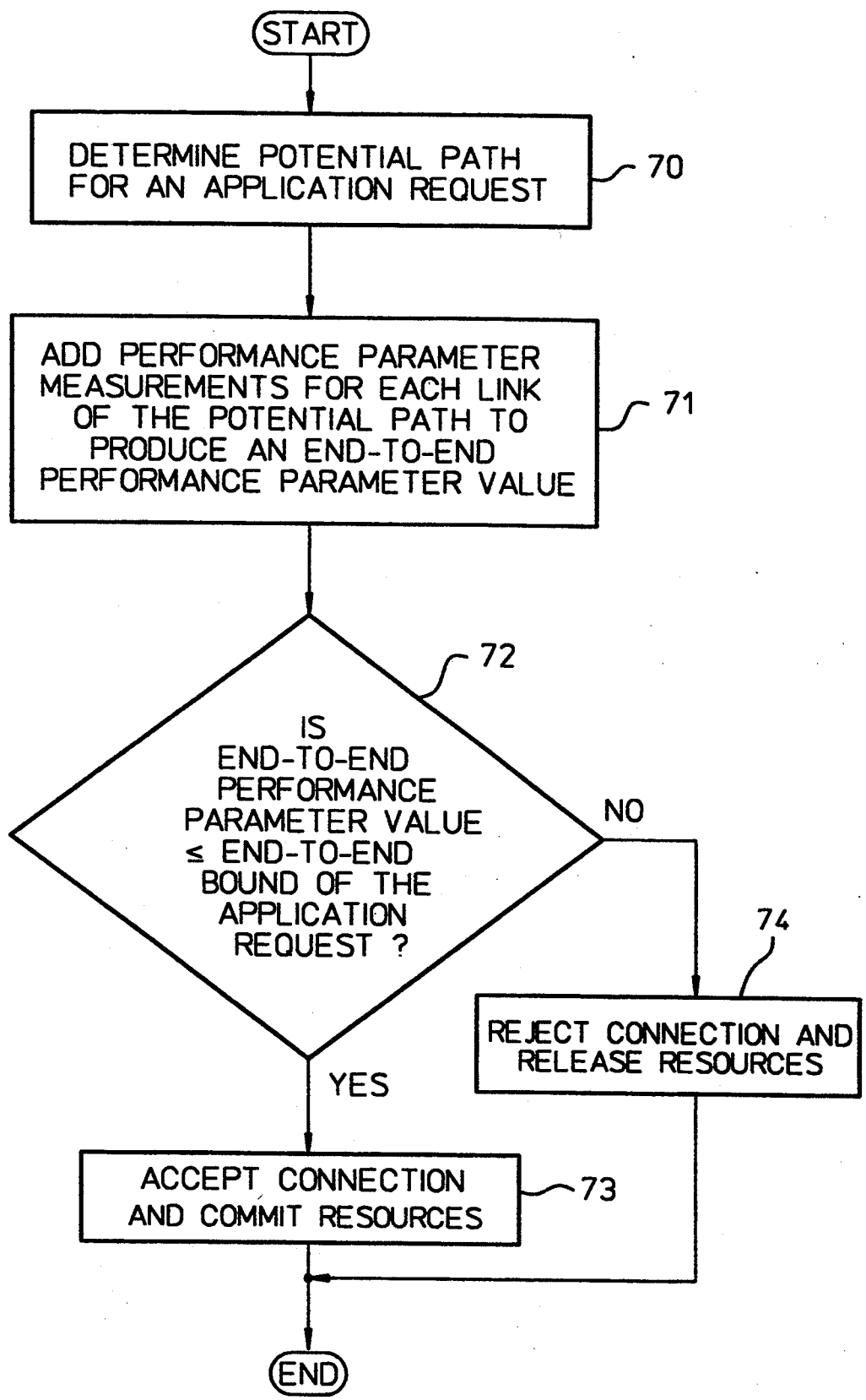
FIG. 7 is a flow chart of an embodiment of the network-level admission control operations of the invention.

Network-level admission control 2 is necessary to apportion the end-to-end QoS requirements of a call request among the various network nodes. FIG. 7 is a flow chart illustrating an embodiment of the network-level admission control operations 2 (FIG. 1) of the invention. The network-level admission control operations 2 carry out admission rule (2) on an end-to-end basis (i.e., whether the application's QoS requirements will be satisfied if a new request is added). This procedure is invoked each time a new application request is received.

Initially, upon receiving an application request, a potential path from source to destination is determined 70 by a routing subsystem. The potential path extends from the source to the destination via links 6, 10. Preferably, the routing subsystem uses the information about the predicted performance parameters and the unavailable links to determine the potential path over which sufficient resources are likely to be available to support the application request.

Since the QoS bounds offered by the links 6, 10 are known by routing servers of the routing subsystem, the bounding end-to-end QoS of the path is equivalent to bounding the performance parameter measurement of each of the links 6, 10 along the path between the source and the destination. Information may be exchanged between routing servers in much the same manner as topology information is exchanged in today's Internet routers. Nevertheless, because of the latency between transmission of status information from one routing server to another, it is not possible to guarantee that all nodes in the chosen path have sufficient resources to admit tile new request. Thus, an application request can be admitted to the network only after the application request is actually received by each of the switching nodes on the chosen path from source to destination.

Thus, prior to admission of the application request, the predicted performance parameter (which may have been updated since being last sent to the routing servers) of each of the outgoing links 6, 10 in the potential path are added 7 1 together. If multiple service classes are used with each link, tile predicted performance parameter for the appropriate service class is used. In any event, the resulting sum is the end-to-end performance parameter value that is available to the application request along the potential path.

In theory, when the performance parameter is delay, the delay experienced by a packet between nodes 4 is made up of a queuing delay at the nodes 4 while waiting to be serviced, and a propagation delay which depends on the distance of the network links 6, 10 to the next node 4. Since the lengths of the network links 6 are fixed, the propagation delays, which depend on the speed of light, are fixed. The queuing delay at each node 4, on the other hand, is not fixed and varies with the level of traffic schedule on the outgoing link 6, 10 corresponding thereto. As discussed above, each node 4 is required to monitor periodically the delay on each of its outgoing links 10. Since the propagation delay is fixed it needs to be measured again only when the topology of the network 20 is changed.

Next, a decision 72 is made based on the resulting end-to-end performance parameter value. If the end-to-end performance parameter value is greater than the end-to-end QoS requirement of the application request, the procedure does not admit the application request along the proposed path. The procedure then stops or tries again with another potential path. On the other hand, if the end-to-end performance parameter value is not greater than the end-to-end delay bound of the application request, then the application request is accepted 73. That is, the application request is admitted into the network over the potential path as an application connection.

Steps 72 and 73 can be performed using a connection set-up message that is sent to each of the switching nodes 4 in the potential path. The connection set-up message would contain the end-to-end delay bound of the application request in a first field and an initially empty field in a second field. As the connection set-up message sequentially proceeds through the network along the potential path, the link delays of the potential path are accumulated in the second field. At the same time, the connection set-up message can also tentatively reserve resources at each of the links as it proceeds along the potential path. When the connection set-up message reaches the destination, the decision 72 can be made.

Thus, a switching node 4 receiving a new request commits to provide satisfactory QoS to that request only if it possesses sufficient resources to do so. Otherwise, the new request is informed 74 about the unavailability of network resources at the intermediate node and another path for admitting the connection may be tried. An application request that is offered QoS commitments at each of the nodes 4 within the potential path is admitted into the network 20. The mininum latency between requesting admission and actual admission is at least equal to the round-trip delay between the source and the destination.

The admission control operations shown in FIG. 7 carries out the network-level admission control operations 2 using an end-to-end QoS guarantee. The end-to-end QoS guarantees may be end-to-end delay guarantees, guarantees of end-to-end ratio of lost packets to transmitted packets (loss ratio), or both. In the case of loss guarantees, each node would monitor the number of packets transmitted and the percentage of packets that are dropped at the switch circuits 22. This is easily performed over long-term by requesting from the source a count of transmitted packets. The scheme might also additionally monitor the percentage of packets that exceed their delay bound. When either of these percentages become significant, further admission of requests and transmission of pseudo packets on the network links causing the violations are suspended.

Admission of Multiple Simultaneous Requests

It is not uncommon links 6, 10 of a network 20 to receive multiple simultaneous requests for admission. When multiple requests for establishment of connections over the same network link (as may be the case for internal nodes in the network) are received simultaneously, admission over that link can be done sequentially. However, after admission of each request, packet delays (e.g., queue delays) over the network link must be repredicted. Since prediction of delays is not an instantaneous operation, multiple simultaneous requests may result in high admission latencies (i.e., greater delay between request for admission and actual admission).

A modified embodiment of the invention can avoid the high admission latencies. The modification enables the link-level admission control operations 1 to handle multiple simultaneous admissions. In particular, multiple pseudo streams are activated on each of the network links 6, 10 (or each service class if multiple queues are provided for each link), rather than just one pseudo stream as in the basic embodiment shown in FIG. 3. The number of pseudo streams that need to be activated simultaneously may be chosen depending upon the number of requests that are likely to arrive at a link within a short time period. Since network links located at the periphery of the network 20 are likely to receive fewer simultaneous requests than links located in the middle of the network 20, the number of pseudo streams that need to be activated simultaneously may vary from one switching node 4 to another depending upon their locations. Of course, if the establishment of multiple pseudo streams restilts in violation or QoS commitments provided by the switching node 4, some or all of the pseudo streams must be deactivated. The number of pseudo streams that have to be deactivated is determined by the smallest number that can revert the QoS bounds back to the required limit.

In this case, information about tile number of permissible admissions is exchanged between routing servers. This information can be used in much the same way as before to determine potential paths for future application requests. For example, if a link can handle 42 three pseudo streams, then the link can simultaneously admitted three application requests.

Supporting Multiple Service Classes

Although so hr it has been assumed that each switching node offers only the same, single class of service, more realistically each switching node 4 should support multiple service classes. In general, real-time multimedia applications have differing delay and loss requirements. For example, real-time, person-to-person multimedia interactions might require delay bounds of tile order of a few hundred milliseconds, whereas relatively less delay-sensitive applications, such as stored media applications (e.g., video on-demand viewing), may tolerate delays on the order of even a few seconds. A network 20 that supports only a single real-time service class over all links 6, 10 would be unable to offer differential service to such multimedia applications. Furthermore, the inflexibility of the network will result in a better-than-requested service for some applications, whereas many other applications may not be permitted to use the network at all.

In order for the switching nodes 4 to offer differential service to applications, the switching nodes 4 must support more than one (real-time) service classes. Different switching nodes 4 may offer different classes of service. For example, a node at the heart of the network may support a greater number of service classes than one located at the periphery.

Each switch circuit 22 is preferably provided with a small number of queues for each link so as to offer a small number of predefined service levels to the connections. The packets of all connections of the same service class are queued together and receive the same QoS guarantees at a given switch circuit 22. Each switch circuit 22 to which a connection is assigned can, however, provide different levels of QoS guarantees for its service classes. In this way, the same connection may receive differing QoS guarantees from different switch circuits 22.

Offering different service classes is desirable not only only distinguishing between services provided to high and low delay-sensitive applications, but also for balancing the effect of large propagation delay using service classes with low queuing delay. For instance, when two persons involved in a conference are located at nearby places, the propagation delay will be very small and the network could provide an acceptable service even when queuing delays are in the range of a few hundred milliseconds. In contrast, the delay guarantee required by the same application over a link could be on the order of a few milliseconds if the participants are separated by a considerable distance.

Although an increase in the number of service classes increases the flexibility of the network 20, it also complicates admission control, both at the link-level admission control operations 1 and the network-level admission control operations 2. Since application requests are admitted to different service classes, it is necessary to associate pseudo streams not with individual network links but with individual service classes supported over each of the network links. Further, activations of a pseudo stream of one service class may result in violations of QoS commitments associated with one or more of the other service classes of the same link. In order to avert such a situation, in activating a pseudo stream it is necessary to monitor the QoS commitments over all the service classes supported by a switching node 4. The pseudo stream can then be deactivated as soon as a violation of QoS bounds associated with the other service classes is detected. A tradeoff must be made between the number of service classes supported by the network and the complexity of admission control.

An increase in the number of service classes also increases the complexity of the routing algorithm and its interaction with admission control. First, information about the service classes supported by a switching node 4 must be provided to all the routing servers in the network 20. Second, the routing servers exchange information about the number of pseudo streams that can be admitted to each of the service classes at the switching nodes 4. Third, the routing algorithm, based on QoS bounds requested by an application request, may not only be expected to determine a path (or set of paths) for the new request, but it may also be expected to determine the service classes at each of the switching nodes 4 that lie on the chosen path. The choices of a suitable path and the service classes along that path may not be mutually exclusive. A nunsbet of policies for selecting a path-service class combination that satisfies the application-specified QoS bound are possible.

Figure 8:
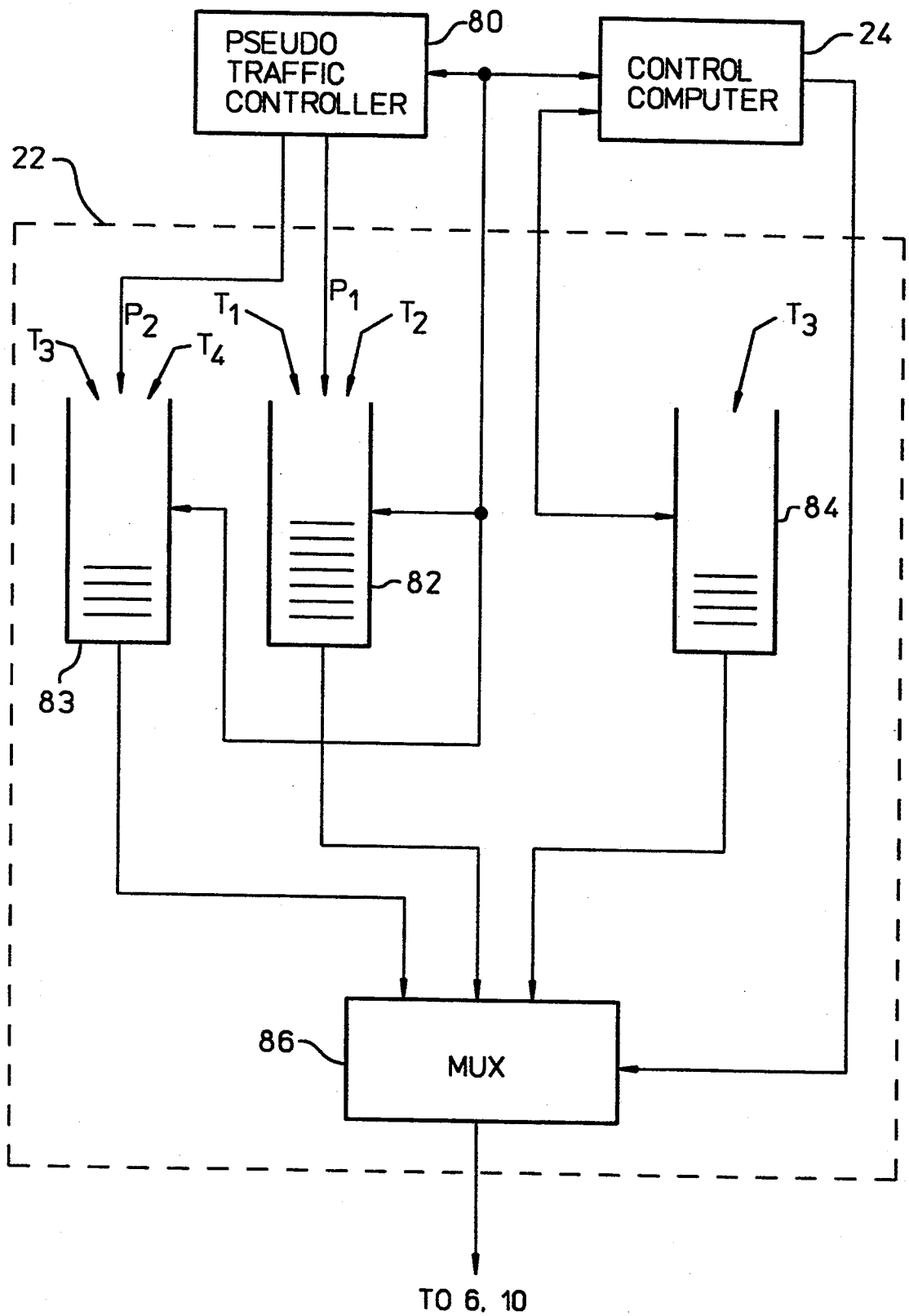
FIG. 8 is a schematic diagram illustrating an apparatus that performs performance parameter prediction for multiple service classes.

FIG. 8 is a schematic diagram illustrating an apparatus that performs delay prediction for multiple service classes. In this apparatus, each switching circuit 22 is assumed to offer three service classes to the connections on each link, namely high delay real-time, low delay real-time and best-efforts. A pseudo traffic controller 80 controls the injection of pseudo traffic P1, P2 into real-time queues 82, 83. Incoming real-time traffic T1, T2 is queued in real-time queue 82, incoming real-time traffic T3, T4 is queued in real-time queue 83, and. the best-efforts traffic T3 is queued in best-effort queue 84. Applications requiring a high delay bound (high delay class) are scheduled in the real-time queue 82, whereas applications requiring a low delay bound (low delay class) are scheduled in the real-time queue 83. Pseudo traffic P 1, P2 is induced 40 into the real-time queues 82, 83, and the queue delay is separately determined 41 (FIG. 4) for each of the real-time queues 82, 83 and compared with the queue bounds. Hence, each link of the nodes 4 has two predicted delays associated therewith. During transmission, the real-time queues 82, 83 are given priority over the bestefforts queue 84. In any event, a multiplexer 86 outputs the packets from one of the queues 82, 83, 84 to the outgoing links 6, 10 of the network 20. Although FIG. 8 has been explained with reference to an example using delay guarantees, the apparatus is similarly applicable to loss guarantees.

Supporting Heterogeneous Sources

So far, the description of the admission control scheme has assumed that traffic sources are homogeneous. In the homogeneous situation, the admission control scheme can obtain precise predictions (since pseudo streams have exactly the same characteristics of the media sources) of the effect of future admissions and can make admission decisions accordingly. However, in a more realistic scenario traffic sources are heterogeneous.

One well known approach for dealing with heterogeneous sources assumes that sources can be classified into a small number of traffic classes, so that all sources within a traffic class possess almost similar traffic characteristics. The admission control scheme according to the invention can easily be integrated with such a classification. One policy is to associate a service class with each traffic class, see Hyman et al., *Joint Scheduling and Admission Control Jbr AT S-based Switching Nodes*, IEEE Journal in Selected Areas in Communications, January 1992; Gallassi etal., supra. Since the characteristics of media streams requesting admission to each service class are well-known (because each service class is associated with one traffic class), the admission control scheme, as described above, is directly applicable; that is, pseudo streams will be assigned to different traffic classes based on their traffic characteristics.

The admission control for heterogeneous traffic can be formulated as follows: given a network link that is being utilized by n connections with traffic characteristics $(r_1,b_1)$, $(r_2,b_2)$, ..., $(r_n,b_n)$ respectively, can a new application request with traffic characteristic $(r, b)$ be admitted over that network link without violating the QoS bounds of existing connections? Initially, assume the switching nodes 4 offer a pre-specified level of service (i.e., service class). The basic principle behind the admission control scheme of the present invention is the same as before; namely, the traffic characteristic of a pseudo stream activated on a network link is used to predict whether or not a new application request can be admitted over that link.

In order to predict the behavior of the network links when additional application requests are admitted, the link-level admission control operations 1 associated with these links activate the pseudo streams. The traffic characteristics of pseudo streams are also expressed in terms of a token-bucket descriptor. Admission decisions liar a network link are based on the estimate of the characteristics of a pseudo stream that can be admitted over that link without causing any QoS violations.

The rule used tier admission of heterogenous traffic over a network link is: if a pseudo stream with traffic characteristic (R, B) can be activated over a network link without causing QoS violations, then any application request with traffic characteristic (r, b) with $r \leq R$ and $b \leq B$ can be admitted over that link. Hence, the existence of a pseudo stream (R, B) indicates that the allotable capacity of the network link being considered is at least R. Clearly, $r \leq R$ implies that sufficient bandwidth exists at the network link to support the new request. Similarly, $b \leq B$ indicates that the additional delay or loss that may be introduced by admission of the new request will not be large enough to result in QoS violations. Therefore, the rule lists sufficient conditions tier admission of a new request (r, b).

According to the rule, the following three cases are unacceptable: (i) $r > R$ and $b > B$, (ii) $r > R$ and $b \leq B$, and (iii) $r \leq R$ and $b > B$. In the first two cases, in which $r > R$, the new request cannot be admitted because it lacks network capacity and has no additional information about the allotable bandwidth of the network link. In case (iii), $r \leq R$ indicates that sufficient network capacity exists to support tile new request, but since $b > B$, it is possible that admission of the new request may increase the delay or loss offered to other connections and may even result in violation of their bounds. Therefore, based on the information available (based on the pseudo stream that was activated on the network link), the new stream (r, b) cannot be admitted. However, if the application is willing to reduce the burstiness of the traffic imposed on the network, by reducing the value of b to a value $b' \leq B$, the application request (r, b') could be admitted over the network link. In order to reduce its burstiness, the application has to provide additional buffering for $b - b'$ bits. Additional buffering at the source also increases the end-to-end delay by $(b-b')r^{-1}$ time units to the end-to-end delay. Therefore, if the end-to-end delay that the application desires is D, the network must try to provide a path with an end-to-end delay of at most $D - (b-b')r^{-1}$.

Routing of heterogeneous traffic is more complicated than routing homogeneous traffic. The information exchanged between routing servers of the routing subsystem in this case should also include tile token-bucket descriptors of the pseudo streams that have been activated over tile different network links.

When a request (r, b) is received, the parameter information is used to determine a path over which the new request may be admitted. One choice of a path P on which the new request may be admitted is such that tile new request is admissible over all the links that make up P, that is, for all links $l_i$ in P, $R_i \geq r$ and $B_i \geq b$ where $R_i$ and $B_i$ denote the token-bucket descriptors of the pseudo stream that is active over a network link $l_i$. If no such path exists, the routing algorithm can try to find another path over links $l_i$ in which the pseudo rate is such that $R_i \geq r$ (i.e., sufficient bandwidth exists to admit the new request over this path P). However, since for some i, $B_i < b$, the application request will be required to reduce its burstiness in order to be admitted over path P. The additional buffering b' required by the application in order liar the request to be admitted over all links in the path is $b' = b - \min B_i$. If D is the application-specified end-to-end delay bound and d is the end-to-end delay offered over path P, the new request can be admitted only if $d + (b-b')r^{-1} \leq D$. Thus, in accordance with admission rule (2), the application request is admitted only if the sum of the delay offered by the network and the additional delay due to buffering at the destination is less than the specified delay bound. Alternatively, the network could inform the application request about the delay bound $d + (b-b')r^{-1} \leq D$ that it can offer. The application request can then decide whether or not to accept the delay bound offered by the network.

The admission control scheme described above for heterogeneous requests is also extendable to support multiple simultaneous heterogeneous requests. In this case, k application requests with traffic characteristics $(r_1, B_1), (r_2, b_2), \ldots, (r_k, b_k)$ may be admitted over a network link on which a pseudo stream (R, B) is currently active if $\Sigma r_i \leq R$ (i=1 to k) and $\Sigma b_i \leq B$ (i=1 to k). This rule corresponds to tile worst-case behavior of the k new requests. The case in which $\Sigma r_i \leq R$ (i=1 to k) but $\Sigma b_i > B$ (i=1 to k) can be handled in the same manner as the corresponding case for a single admission request, that is, by requesting that some of the k applications decrease their bursts.

Multiple service classes can also be supported in the same manner as in the case of homogeneous sources. Pseudo streams are established for each of the service classes. Admission of a request to a service class at a network link is based on the traffic characteristics of an active pseudo stream belonging to that class. If the pseudo stream corresponding to that class is inactive, no new request can be admitted to that class until one or more connections utilizing the network link are terminated.

Enhancement

The admission control scheme may be enhanced to provide greater efficiency. The delay-prediction technique described above wastes network bandwidth when dummy pseudo packets are discarded and the corresponding network bandwidth is left unused. In particular, packet slots on the outline links 6, 10 are wasted when pseudo packets are discarded at the originating switching nodes 4. To improve efficiency, best-effort packets may be transmitted in place of the discarded pseudo packets. Since best-effort traffic does not require delay or loss bounds, this traffic is not subject to performance monitoring. Of course, network bandwidth will be wasted in handling pseudo packets if sufficient best-effort data is not available. In that case, however, since the load on tile network is less than its capacity, a portion of the network bandwidth would have remained unutilized.

Figure 9:
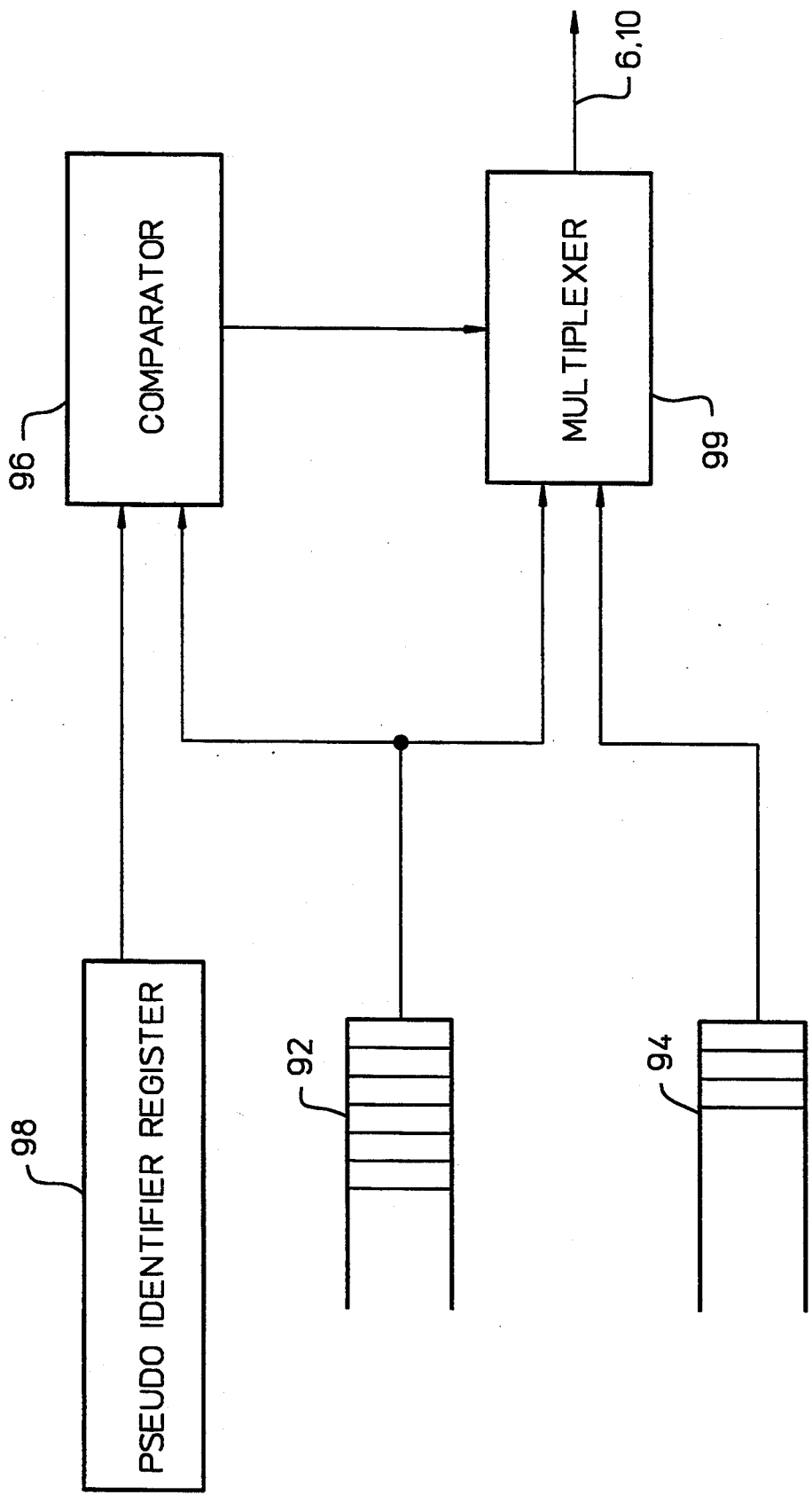
FIG. 9 is a schematic diagram of an optional modification to the switching nodes so that best-effort packets are transported over tile pseudo streams in the place of pseudo packets to reduce waste of network bandwidth.

This efficiency enhancement can be implemented in either hardware or a combination of hardware and software. FIG. 9 is a block diagram illustrating an example of a hardware implementation of this enhancement for delay-prediction. In FIG. 9, the switch circuit 22 includes a real-time queue 92 and a best-effort queue 94 similar to that shown in FIG. 8. The real-time queue 92 holds real-time packets to be transmitted on the network 20 via link 6, 10. Similarly, the best-effort queue 94 holds best-effort packets to be transmitted on the network 20 via link 6, 10. Before transmitting a real-time packet, a comparator 96 compares an identifier of the real-time packet at the head of the real-time queue 92 with a predetermined identifier stored in a pseudo identifier register 98 to determine whether or not the real-time packet is a pseudo packet. If the real-time packet is a pseudo packet, a multiplexer 99 discards the pseudo packet and transmits tile packet that is at the head of the best-effort queue 94 for that network link 6, 10. On the other hand, if the real-time packet is not a pseudo packet, then the multiplexer 99 transmits the real-time packet held in the real-time packet queue 92. If the real-time queue 92 is empty, best-effort traffic is transmitted with no delay.

Another enhancement would be to require a traffic source to notify the node if it wishes to suspend transmission. Thereafter, the node can ensure that resources are reserved the the suspended traffic source so that the node does not become overloaded.

Advantages

The admission control scheme of tile invention achieves a proper balance between network utilization and service commitments to applications, enjoys technology independence (e.g., not dependent on the manner in which packets are queued at the switches, the queue servicing discipline employed at the switches, the capacity of the network links, etc.), easily adapts to changes in network conditions and network administration policies, and requires only minimal overhead at the network which is advantageous in implementing high-speed networks.

The admission control scheme of the invention, unlike most known schemes, provides information to routing servers so that the routing servers can make effective choices of candidate paths on which there is a high probability that the new application request can be admitted. Frequent exchange of status information (from switching nodes to routing servers) facilitates more precise choice of routes, but it also introduces additional network overheads because of the bandwidth utilized by routing status messages. Accordingly, the status updates should be triggered only on sufficiently large changes in the status of the networks links.

The invention is also flexible enough to permit applications to establish multi-cast connections from a single source to a group of destinations. A multicast routing algorithm which is based on end-to-end delay bounds may be used. See, e.g., Kompella et al., *Multicasting for Multimedia Applications*, 1992 Proceedings of IEEE INFOCOM, May 1992, pp. 2078–2085.

The many features and advantages of the invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for monitoring performance of a link in a network having a plurality of nodes interconnected by links, each of the nodes having at least one queue associated with each of the links, said method comprising:
    adding pseudo traffic to existing traffic through a queue associated with a link, but not on the link itself; and
    predicting at least one performance guarantee that the link can offer to a connection request.

2. A method as recited in claim 1, wherein tile performance guarantee is predicted by determining whether the link can support the pseudo traffic without violating performance guarantees of the existing traffic on the link.

3. A method as recited in claim 1, wherein the performance guarantee is one of a delay guarantee and a loss guarantee.

4. An admission control method for admitting a connection request to a network, the network includes a plurality of nodes interconnected by links, each of the nodes having at least one queue associated with each of the links, said method comprising the steps of:
    (a) inducing pseudo traffic into a plurality of the queues associated with the links, but not on the links themselves;
    (b) subsequently measuring performance parameters of the queues; and
    (c) determining whether to admit the connection request based on the measured performance parameters.

5. A method as recited in claim 4, wherein tile connection request is a real-time connection request, and wherein the queues are real-time queues.

6. A method as recited in claim 5, wherein said method firther comprises the steps of:
    (d) determining, prior to step (c), the queues unable to handle the pseudo traffic and identifying the same as unavailable queues; and
    (e) removing the pseudo traffic from the unavailable queues.

7. A method as recited in claim 6, wherein said determining step (d) determines the queues unable to handle the pseudo traffic by determining the queues that can no longer continue to satisfy their performance guarantees to existing connections after the pseudo traffic is induced.

8. A method as recited in claim 6, wherein the connection request specifies at least an end-end performance bound, a traffic contract, and a destination network host, and
    wherein said determining step (c) comprises the steps of:
    (c1) distributing the measured performance parameters and information on the unavailable queues to a routing system;
    (c2) determining a proposed path for the connection request through the network from a source network host to the destination network host via only the queues that can handle the pseudo traffic;
    (c3) determine whether the sum of the performance parameter measurements through the queues in the proposed path is not greater than the end-end performance bound of the connection request; and
    (c4) deciding whether to admit the connecting request based on said determining step (c3).

9. A method as recited in claim 8, wherein the measured performance parameters are queue delays, and the end-end performance bound is an end-end delay bound.

10. A method as recited in claim 8, wherein the measured performance parameters are loss ratios, and tile end-end performance bound is an end-end loss bound.

11. A method as recited in claim 6, wherein the connection request specifies at least an end-end performance bound and a destination network host,
wherein said method further comprises the step of (t) determining, prior to step (c), a maximum amount of pseudo traffic which each of the queues can take on while still satisfying their performance guarantees to existing connections, and
wherein said determining step (c) comprises the steps of:
(c1) distributing tile measured performance parameters and the maximum amounts of pseudo traffic to a routing system;
(c2) determining a proposed path for the application request through the network from a source network host to the destination network host via only the links in which the queue associated therewith has sufficient bandwidth to support the connection request; and
(c3) deciding whether to admit the connection request based on whether the sum of the performance parameter measurements through the links in the proposed path is less than or equal to the end-end performance bound of the application request.

12. A method as recited in claim 11, wherein the connection request further specifies a traffic contract defined by a token-bucket descriptor (r, b), and the maximum amount of pseudo traffic is defined by a token-bucket descriptor (R, B), and
wherein step (c2) determines that the links have sufficient bandwidth to support the connection request when the token-bucket descriptor (r, b) of the connection request is less than or equal to the token-bucket descriptor (R, B) of the maximum amount of pseudo traffic.

13. A method as recited in claim 5,
wherein said inducing step (a) induces a plurality of streams of the pseudo traffic into the queue associated with each of the links,
wherein said method further comprises the step of (d) predicting a number of connection requests which each of the links can simultaneously admit to said network without violating performance commitments by said network to existing connections, and
wherein said determining step (c) includes determining whether to admit simultaneous connection requests based on the numbers predicted in step (d).

14. A network node for an integrated network, comprising:
a connection circuit for passing traffic by operatively connecting an incoming link to an outgoing link;
a pseudo traffic controller for supplying pseudo traffic;
a first queue, operatively connected to said connection circuit and said pseudo traffic controller, for queuing the pseudo traffic and real-time traffic; and
a performance parameter prediction unit, operatively connected to said first queue, for predicting a performance parameter of said first queue,
wherein said connection circuit transmits the real-time traffic output from said first queue and discards the pseudo traffic output from said first queue.

15. A network node as recited in claim 14, wherein said network node further comprises admission means for determining whether to admit a connection request to the network based on the predicted performance parameter.

16. A network node as recited in claim 14, wherein said network node further comprises means for distributing the performance parameter predicted to a routing system.

17. A network node as recited in claim 14, wherein said node further comprises a second queue for queuing best-effort traffic, and wherein said connection circuit transmits the real-time traffic and the best-effort traffic.

18. A network node as recited in claim 17, wherein said connection circuit transmits the best-effort traffic in place of the pseudo traffic.

19. A network node as recited in claim 17, wherein tile traffic comprises packets of data, and
wherein said node further comprises:
a comparator for comparing a header of each packet of the traffic exiting said first queue with a predetermined pseudo traffic identifier; and
a selector for selecting a packet exiting said first queue for transmission by said connection circuit when said comparator indicates that the packet exiting said first queue is from the real-time traffic and for selecting a packet of the best-effort traffic from said second queue for transmission by said connection circuit when said comparator indicates that the packet exiting said first queue is from the pseudo traffic.

20. A network node as recited in claim 14, wherein said node comprises a plurality of said first queues for each of the links, each of said first queues corresponding to a different traffic class.

21. An admission control system for controlling admission of an additional connection to an integrated network, a connection request for the admission of the additional connection to the integrated network includes an end-to-end performance bound requirement, the integrated network having a plurality of nodes interconnected by links, each of the nodes having at least one queue associated with each of its outgoing links, said system comprising:
link-level admission control means for monitoring available network resources, said link-level admission control means including at least
means for inducing pseudo traffic into the queue of each of the outgoing links, but not on the links themselves,
means for measuring a performance parameter of the queue for each of the outgoing links, and
means for determining whether each of the outgoing links can handle the additional connection based on the measured performance parameters; and
network-level admission control means for deciding whether to accept or reject the additional connection, said network-level admission control means including at least
means for determining a potential path for the connection request in accordance with the measured performance parameters and the end-to-end performance bound requirement of the connection request,
means for determining a sum of the measured performance parameters for each of the outgoing link in the potential path, and
means for accepting the additional connection along the potential path when the sum of the measured performance parameters is not more than the endto-end performance bound requirement of the connection request.

22. An integrated network, comprising:
a plurality of nodes interconnected by links, each of the nodes having at least one queue associated with each of the links for temporarily storing real-time traffic for the respective link;
means for inducing pseudo traffic into the queues associated with each of the links, but not on the links themselves; and
congestion detection means for measuring performance of the queues to proactively predict congestion of the links.

23. An integrated network as recited in claim 22, wherein said network provides performance commitments to connections admitted to said network, and
wherein said congestion detection means measures a performance parameter for each of the queues after the pseudo traffic has been induced and then predicts whether said network can continue to satisfy the performance commitments provided to connections already admitted to said network if a connection request is admitted to said network.

24. A method as recited in claim 4, wherein said inducing and said measuring occur before a connection request is received, and said determining occurs after the connection request is received.

* * * * *